United States Patent
Matsuda et al.

(10) Patent No.: US 8,380,405 B2
(45) Date of Patent: Feb. 19, 2013

(54) TROUBLE-DECIDING DEVICE FOR ELECTRIC OIL PUMP TO BE USED IN TRANSMISSION OF VEHICLE HAVING ENGINE AUTOMATIC-STOP CONTROL DEVICE

(75) Inventors: Takashi Matsuda, Isehara (JP); Masato Koga, Hiratsuka (JP); Hironori Nihei, Isehara (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 263 days.

(21) Appl. No.: 12/994,338

(22) PCT Filed: May 27, 2009

(86) PCT No.: PCT/JP2009/059674
§ 371 (c)(1),
(2), (4) Date: Nov. 23, 2010

(87) PCT Pub. No.: WO2009/147982
PCT Pub. Date: Dec. 10, 2009

(65) Prior Publication Data
US 2011/0077828 A1 Mar. 31, 2011

(30) Foreign Application Priority Data
Jun. 3, 2008 (JP) .................................. 2008-145231

(51) Int. Cl.
*G06F 7/00* (2006.01)
(52) U.S. Cl. ................. 701/54; 701/51; 701/22; 477/37; 180/65.28
(58) Field of Classification Search ............... 701/22, 701/51, 54, 104; 903/903, 919, 917; 477/37, 477/39; 180/65.26, 65.27, 65.28, 65.285
See application file for complete search history.

(56) References Cited

U.S. PATENT DOCUMENTS

| 6,881,170 B2 | 4/2005 | Onoyama et al. |
| 2003/0109970 A1 | 6/2003 | Nakamori et al. |
| 2003/0197385 A1 | 10/2003 | Onoyama et al. |
| 2004/0029677 A1* | 2/2004 | Mori et al. ......................... 477/3 |

FOREIGN PATENT DOCUMENTS

| JP | 2000-45807 A | 2/2000 |
| JP | 2004-3425 A | 1/2004 |
| JP | 2004-92885 A | 3/2004 |
| JP | 2009-121518 A | 6/2009 |

* cited by examiner

*Primary Examiner* — Gertrude Arthur Jeanglaude
(74) *Attorney, Agent, or Firm* — Foley & Lardner LLP

(57) ABSTRACT

At vehicle stop judgment time t1, a first engine automatic-stop control permission judgment, based on idle stop permission conditions by which an instant permission judgment can be possible, is carried out. If a result of the first engine automatic-stop control permission judgment at time t1 is "permitted", the second engine automatic-stop control permission judgment, based on an idle stop permission condition which requires a certain time for the judgment, is initiated, and an electric oil pump ON (drive) command (the test drive command) is issued. At time t2 at which an actual drive of the electric oil pump in response to the test drive command is detected, it is judged that a failure of an electric system of the electric oil pump and a foreign matter-biting failure of the electric oil pump do not occur, then a failure judgment of the electric oil pump becomes "normal". This judgment is completed before time t3 at which the second engine automatic-stop control permission judgment ends, and both of "permitted" of a result of the second engine automatic-stop control permission judgment and "normal" of the failure judgment of the electric oil pump, an idle stop ON command is not outputted.

8 Claims, 7 Drawing Sheets

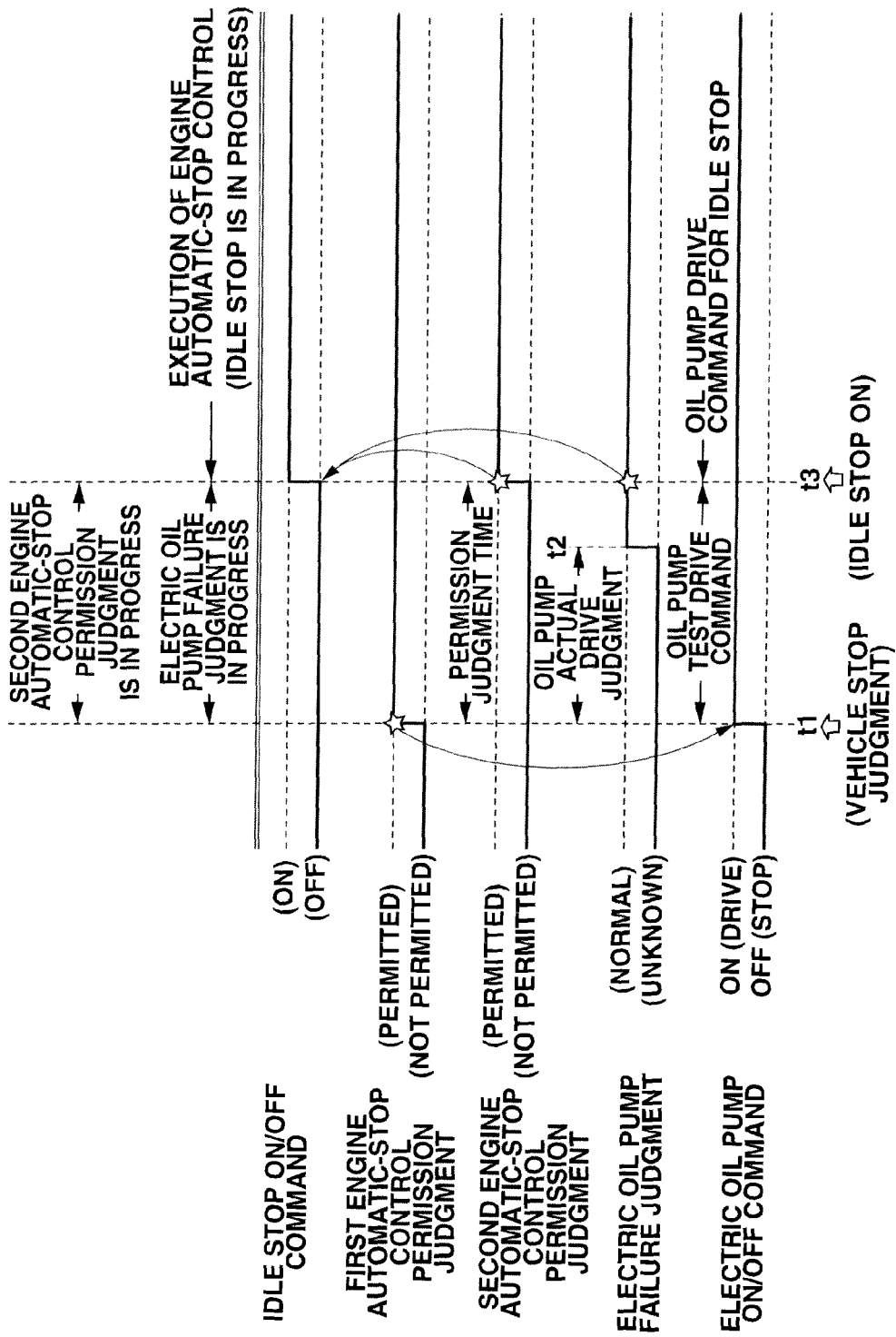

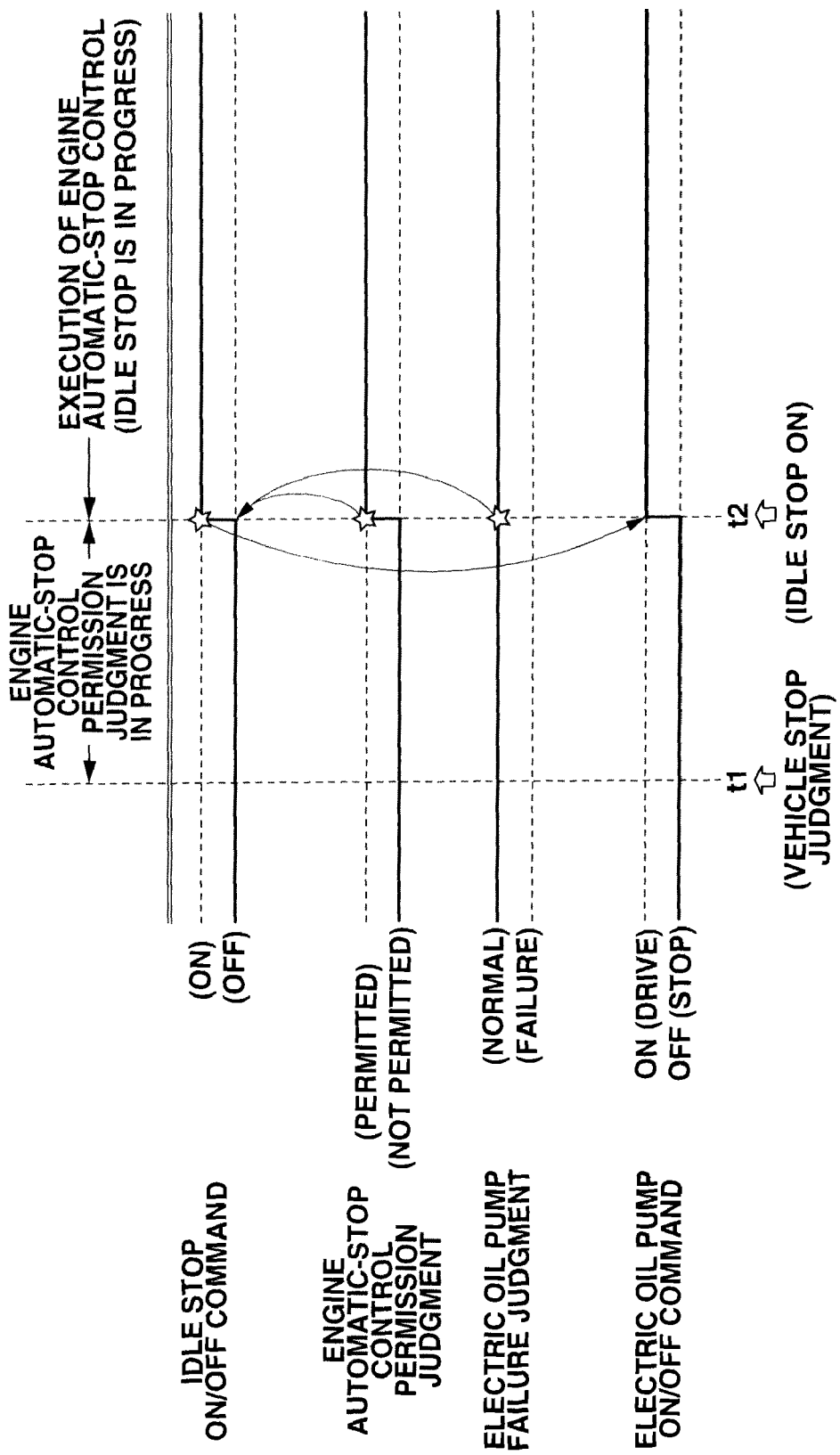

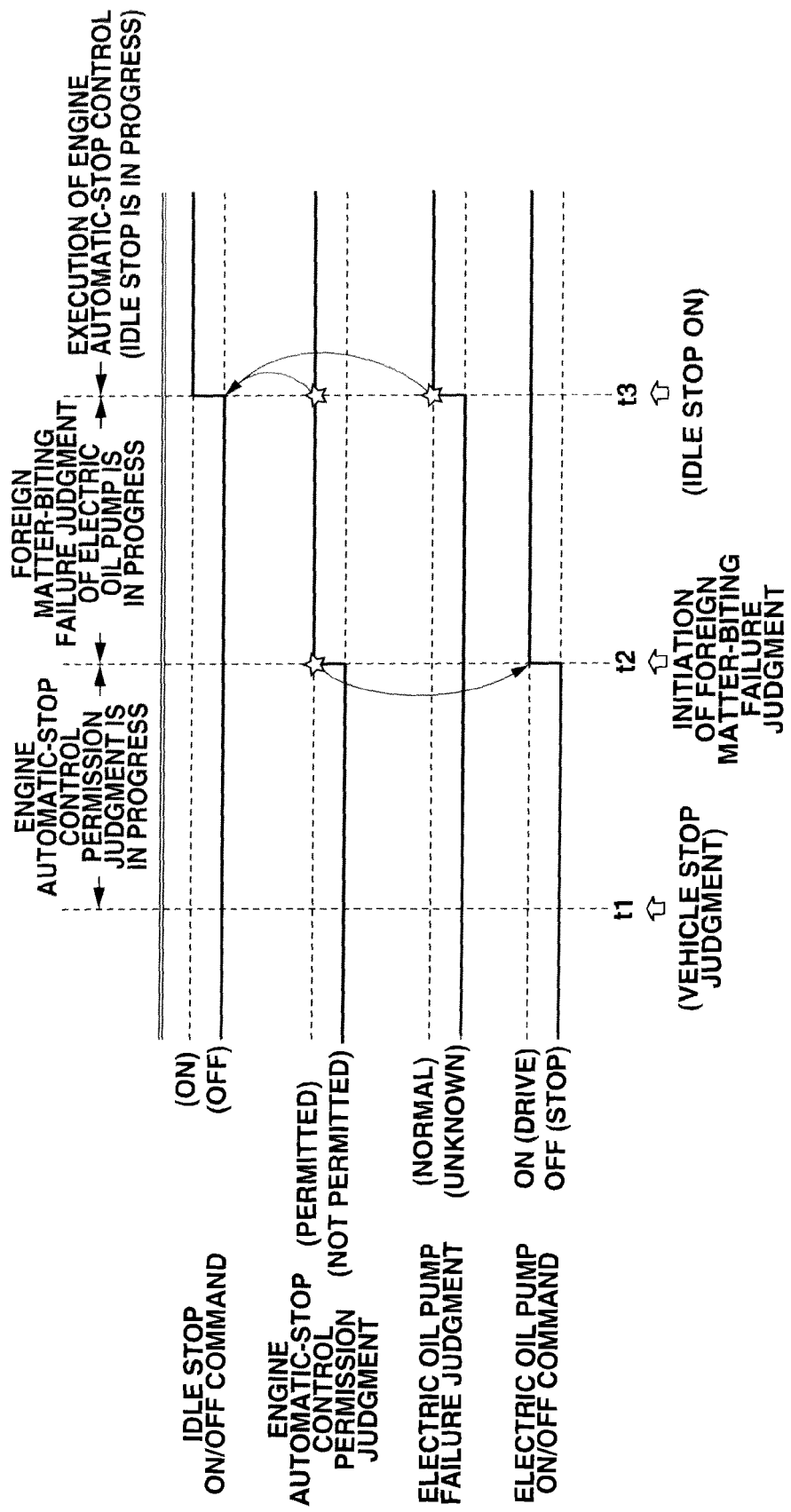

TROUBLE-DECIDING DEVICE FOR ELECTRIC OIL PUMP TO BE USED IN TRANSMISSION OF VEHICLE HAVING ENGINE AUTOMATIC-STOP CONTROL DEVICE

TECHNICAL FIELD

The present invention relates to a vehicle having an engine automatic-stop control device by which, the vehicle can travel by power from an engine through a transmission, and during engine operation, the transmission is controlled by hydraulic pressure from an engine-driven oil pump driven by the engine, and upon a judgment of vehicle stop, when predetermined conditions are satisfied, an engine automatic-stop control (so-called idle stop) that automatically stops the engine is performed, also the transmission is kept in a power transmission starting state that is a state just before starting to transmit the power by working fluid from an electric oil pump instead of the engine-driven oil pump, and more particularly to technique of failure judgment of the electric oil pump used for the transmission.

BACKGROUND ART

As a method for improving fuel economy of the vehicle, there is a technique of the engine automatic-stop control that automatically stops the engine when predetermined conditions are satisfied, e.g. as one condition, a vehicle stop state in which there is no intention of starting the vehicle continues for a setting time at a vehicle stop.

In this engine automatic-stop control technique, when an operation which is considered as driver's intention to start the vehicle is performed, e.g. when a brake pedal is released and a braking state is changed from a working state to a non-working state, the engine is automatically restarted by cancelling the engine automatic-stop control.

Here, since the engine is not running during execution of the engine automatic-stop control, there is no hydraulic pressure from the engine-driven oil pump driven by this engine, and the transmission is in a state incapable of transmitting the power.

When the engine is started from this state by cancel of the engine automatic-stop control, the hydraulic pressure from the engine-driven oil pump driven by this engine start is generated, and the transmission becomes in a state capable of transmitting the power.

However, there is a delay of response to generate the hydraulic pressure by the engine-driven oil pump driven by the engine start and to bring the transmission to the power transmission-capable state, and this not only deteriorates a vehicle restart response, but also there arises a problem that a restart shock occurs due to engine RPM surge or engine flare-up or this adversely affects durability of the transmission.

Thus, as described, for example, in Patent Document 1, a technique which operates the electric oil pump instead of the engine-driven oil pump and keeps the transmission in the power transmission starting state by the working fluid from the electric oil pump, during execution of the engine automatic-stop control, has been proposed.

According to this technique, since the transmission is kept in the power transmission starting state by the working fluid from the electric oil pump even during execution of the engine automatic-stop control, the working fluid from the engine-driven oil pump is able to increase a transmission control pressure from a hydraulic pressure value generated by the electric oil pump to a hydraulic pressure value that brings the transmission to the power transmission-capable state instantly after the engine restart by the cancel of the engine automatic-stop control. Therefore, the transmission can transmit the power just after the engine start without an occurrence of slip, and the vehicle restart response can be improved, also the problem such as the occurrence of the restart shock and the adverse effect on the durability of the transmission can be resolved.

Here, upon failure of the electric oil pump, i.e. when the electric oil pump cannot generate a pump pressure nor increase the pump pressure as specified due to its own failure or failure of a power system or a control system, the transmission cannot be kept in the power transmission starting state during execution of the engine automatic-stop control, and not only a primary object such as the improvement of the restart response cannot be achieved, but also a great restart shock and the adverse effect on the transmission occur.

Thus, at the failure of the electric oil pump, it is desirable to forbid the engine automatic-stop control, which is mentioned in Patent Document 1 too.

A technique of forbidding of the engine automatic-stop control at the failure of the electric oil pump described in Patent Document 1 is a technique that judges the failure of the electric oil pump at the engine automatic-stop control, and permits the engine automatic-stop control then executes the automatic engine stop in a case of judgment of no failure, or forbids the engine automatic-stop control then does not execute the automatic engine stop in a case of judgment of the failure.

CITATION LIST

Patent Document 1: Japanese Patent Provisional Publication Tokkai No. JP2000-045807 (FIG. 1, Page 5)

SUMMARY OF THE INVENTION

Technical Problem

However, as the judgment in this technique, the failure judgment of the electric oil pump is carried out at the engine automatic-stop control, then according to the judgment result, the engine automatic-stop control is permitted as it is and started, or the engine automatic-stop control is forbidden and is not executed. Because of this, the following problems explained below arise.

That is, as the failure of the electric oil pump, there are failures; drive failure of the electric oil pump due to failure of an electric system such as breakage (disconnection) in the power system or the control system relating to drive parts including a motor that controls the drive of the electric oil pump, and foreign matter-biting failure that is failure physically incapable of drive, caused by the fact that the electric oil pump bites the foreign matter having gotten into the oil.

Regarding the former failure associated with the electric system, the failure judgment can be made by electrical troubleshooting or electrical failure check without driving and rotating the electric oil pump through the motor. On the other hand, with regard to the latter foreign matter-biting failure, the judgment as to whether or not the electric oil pump fails cannot be carried out unless the electric oil pump is actually rotated through the motor as a test rotation.

In view of the foregoing, regarding such conventional technique that the failure judgment of the electric oil pump is carried out upon the execution of the engine automatic-stop control and in the case of no failure, the engine automatic-stop control is permitted then the automatic engine stop is executed and in the case of the failure, the engine automatic-stop control is forbidden then the automatic engine stop is not executed, although a specific description concerning the failure judgment of the electric oil pump is not provided in Patent Document 1, it is reasonable to assume that, the former electric system-related failure is judged at the engine automatic-stop control and in a case of no electrical failure, the engine automatic-stop control is permitted as it is then the automatic engine stop is executed and in a case of the electrical failure, the engine automatic-stop control is forbidden then the automatic engine stop is not executed.

Here, Patent Document 1 discloses that the motor controlling the drive of the electric oil pump not exclusive to the oil pump but is a high power motor which also serves as a starter motor that controls the engine start.

In a case where the electric oil pump is driver by such high power motor as to also serve as the starter motor, even if the electric oil pump bites such small foreign matter as to get into the oil, there is no case where the electric oil pump becomes incapable of working.

Therefore, originally, the electric oil pump described in Patent Document 1 is a pump that does not create the problem of the foreign matter-biting failure. Also from this point, the technique of the electric oil pump failure judgment described in Patent Document 1 is only the technique that makes the judgment of the electric system-related failure of the electric oil pump and makes a decision as to whether to permit or forbid the engine automatic-stop control.

Further, it is obvious that the technique of Patent Document 1 cannot make a decision as to whether to permit or forbid the engine automatic-stop control by judging the foreign matter-biting failure of the electric oil pump.

Here, in a case where the electric oil pump is driven by the motor used only for the electric oil pump, the motor is a low power motor that serves only to drive the electric oil pump as long as the motor is exclusive to the electric oil pump.

Regarding the electric oil pump driven by such low power motor, if the electric oil pump bites even the small foreign matter having gotten into the oil, the electric oil pump becomes incapable of working.

In this case, in the technique of Patent Document 1, despite the fact that the electric oil pump is in the state incapable of working due to the foreign matter-biting, since no failure is judged by the judgment of the electric system-related failure, the engine automatic-stop control is executed. For this reason, the above-mentioned problems occur, namely that not only the primary object such as the improvement of the restart response cannot be achieved, but also occurrence of the problem such as occurrence of the great restart shock and the adverse effect on the transmission cannot be avoided.

Hence, in the case where the electric oil pump is driven by the motor used only for the electric oil pump, it is required that the foreign matter-biting failure of the electric oil pump be judged then the decision as to whether to permit or forbid the engine automatic-stop control be made, and the technique of the foreign matter-biting failure judgment of the electric oil pump is essential.

However, as is clear from the foregoing, the technique of Patent Document 1 cannot meet these requirements, and cannot avoid the occurrence of the problems.

In view of the above problems, an object of the present invention is to provide an apparatus which is capable of judging the foreign matter-biting failure of the electric oil pump, to meet the above requirements.

Solution to Problem

For this object, a failure judgment apparatus of the electric oil pump, used for the transmission of the vehicle having the engine automatic-stop control device, is configured as follows.

First, the vehicle having the engine automatic-stop control device, to which the present invention is applied, will be explained.

This is a vehicle having an engine automatic-stop control device by which, the vehicle can travel by power from an engine through the transmission, and during engine operation, the transmission is controlled by hydraulic pressure from an engine-driven oil pump driven by the engine, and upon a judgment of vehicle stop, when predetermined conditions are satisfied, an engine automatic-stop control that automatically stops the engine is performed, also the transmission is kept in a power transmission starting state that is a state just before starting to transmit the power by working fluid from the electric oil pump that is driven by a dedicated motor instead of the engine-driven oil pump.

The failure judgment apparatus of the electric oil pump, in the vehicle having an engine automatic-stop control device, is characterized in that, before the engine stop by the engine automatic-stop control, a pump test drive command is issued to the dedicated motor, and an electric oil pump failure prejudging means that judges the failure of the electric oil pump by a judgment as to whether the electric oil pump is actually driven in response to the pump test drive command is provided.

Effects of Invention

In the failure judgment apparatus of the electric oil pump of the present invention, before the engine stop by the engine automatic-stop control, the pump test drive command is outputted to the dedicated motor of the electric oil pump and the failure of the electric oil pump is judged by the judgment as to whether the electric oil pump is actually driven in response to this test drive command.

Hence, even the failure caused by the drive-incapable state by the foreign matter-biting of the electric oil pump, in the case where the motor is the low power motor because of the dedicated motor, can surely be judged.

Consequently, the present invention can avoid the following problems that, not only the primary object such as the improvement of the restart response cannot be achieved, but also the great restart shock and the adverse effect on the transmission occur, which is caused by the fact that this failure judgment is impossible and this allows the execution of the engine automatic-stop control.

In addition, in the present invention, before the engine stop by the engine automatic-stop control, the pump test drive command is issued to the dedicated motor of the electric oil pump and the failure judgment as to whether the electric oil pump is actually driven in response to this test drive command is carried out.

Therefore, this failure judgment is already completed at time at which the engine stop by the engine automatic-stop control should be initiated. Thus the above-mentioned operation and effects can be achieved without delay of a timing of the initiation of the engine stop by the engine automatic-stop control.

BRIEF DESCRIPTION OF THE DRAWINGS

FIG. 5 is an operation time chart of the idle stop control by the embodiment shown in FIGS. 1 to 3.

FIG. 6 is an operation time chart of the idle stop control by a conventional apparatus.

FIG. 7 is an operation time chart of the idle stop control of a case where a foreign matter-biting failure judgment of the electric oil pump is only added to the conventional apparatus.

EMBODIMENTS FOR CARRYING OUT THE INVENTION

In the following description, embodiments of the present invention will be explained with reference to drawings.

Figure 1:
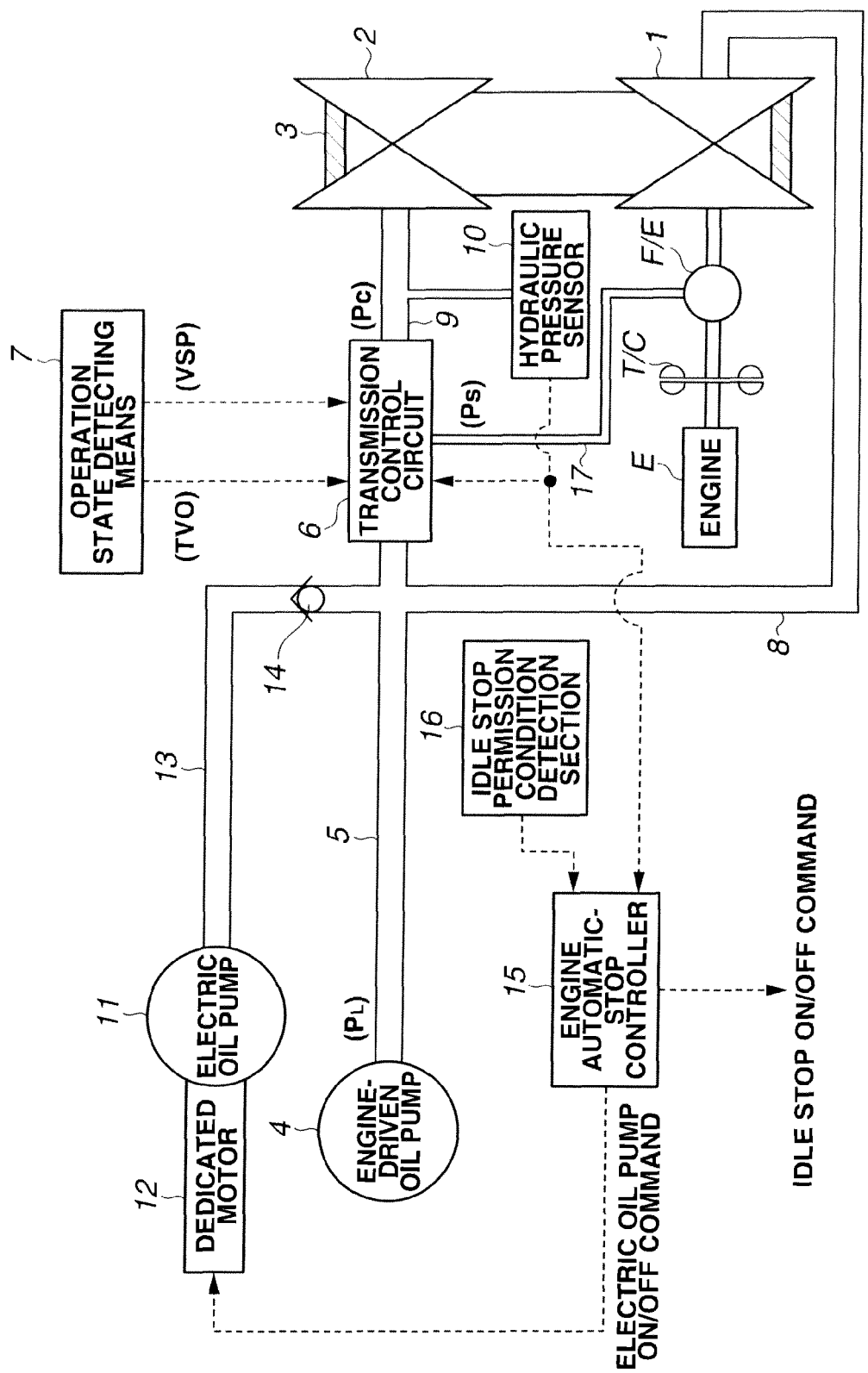
FIG. 1 is a system block diagram showing an embodiment of a failure judgment apparatus of an electric oil pump, configured for a vehicle having an engine automatic-stop control device, which is provided with a V-belt-drive continuously variable transmission.

FIG. 1 shows an embodiment of a failure judgment apparatus of an electric oil pump, configured for a vehicle having an engine automatic-stop control device, which is provided with a V-belt-drive CVT (continuously variable transmission).

Reference sign 1 denotes a primary pulley of the V-belt-drive CVT, reference sign 2 denotes a secondary pulley of the V-belt-drive CVT, and these primary and secondary pulleys 1 and 2 are arranged with both pulleys aligned with each other on a substantially same surface perpendicular to their respective axes.

A V-belt 3 is wound around these both primary and secondary pulleys 1 and 2, then a transmission part of the V-belt-drive CVT is formed.

The primary pulley 1 is connected to an engine E through a starting frictional element F/E such as a forward clutch and a reverse brake provided in a forward/reverse changing mechanism (not shown) and a torque converter T/C. The primary pulley 1 inputs rotation from the engine E through the torque converter T/C and the starting frictional element F/E.

Rotation of the primary pulley 1 is transmitted to the secondary pulley 2 through the V-belt 3. By transmitting rotation of the secondary pulley 2 to driving wheels, the vehicle travels.

In the V-belt-drive CVT, during the transmission, one V-groove sheave surface (in FIG. 1, a left hand side movable heave surface) of opposing sheave surfaces which form V-groove of the secondary pulley 2 moves toward or away from the other stationary sheave surface, then a V-groove width decreases or increases.

Further, one V-groove sheave surface (in FIG. 1, a right hand side movable sheave surface) of the primary pulley 1 moves away from or toward the other V-groove sheave surface (a stationary sheave surface) which faces the movable sheave surface, then a V-groove width increases or decreases.

With this pulley movement, an arc diameter of the wound belt 3 with respect to the primary pulley 1 and the secondary pulley 2 is continuously changed, thereby continuously varying transmission ratio.

Transmission control of the V-belt-drive CVT is performed by adjusting a movable sheave surface pressing hydraulic pressure of the secondary pulley 2. This transmission control is carried out by a transmission control circuit 6 (an electronic control section and a hydraulic pressure control section) as follows, with working fluid supplied to a line pressure oil passage 5 from an engine-driven oil pump 4 driven by the engine E connecting to the primary pulley 1 being a medium.

Here, the engine-driven oil pump 4 is a non-reversible type pump (a pump by which the working fluid in the oil passage 5 does low into an oil pan in a pump stop state) such as a rotary vane pump.

That is, an engine throttle opening TVO and a vehicle speed VSP etc., which indicate an operation state of the vehicle, are detected by an operation state detecting means 7, and on the basis of these operation information, the transmission control circuit 6 regulates the working fluid supplied from the oil pump 4 to the oil passage 5 to a line pressure $P_L$ equivalent to a transmission input torque by a regulator valve (not shown) provided in the transmission control circuit 6.

This line pressure $P_L$ acts on the movable sheave surface of the primary pulley 1 via a primary pulley pressure oil passage 8. With this, the movable sheave surface of the primary pulley 1 is forced toward the stationary sheave surface with a thrust force equivalent to the transmission input torque inputted, and the V-belt 3 is pressed between these sheave surfaces by the force equivalent to the transmission input torque.

The transmission control circuit 6 further determines a target input revolution speed (a target transmission ratio) suitable for a current operation state from a predetermined shift map on the basis of the operation information such as the engine throttle opening TVO and the vehicle speed SP detected by the operation state detecting means 7.

Then the transmission control circuit 6 produces such transmission control pressure Pc that the target input revolution speed (the target transmission ratio) can be achieved with the line pressure $P_L$ in the oil passage 5 being an initial pressure (or an source pressure). The transmission control circuit 6 supplies this transmission control pressure Pc to the secondary pulley 2 as the movable sheave surface pressing hydraulic pressure of the secondary pulley 2 via a transmission control pressure oil passage 9.

The secondary pulley 2 presses the V-belt 3 between both sheave surfaces with a movable sheave surface pressing force by the above hydraulic pressure and a spring force of a secondary pulley built-in spring (not shown) that forces the movable sheave surface toward the stationary sheave surface, then the transmission control of the V-belt-drive CVT is performed so as to equalize an input revolution speed (a transmission ratio) of the secondary pulley 2 to the target input revolution speed (the target transmission ratio).

Here, regarding the transmission control pressure Pc, there is a possibility that the transmission control pressure Pc will deviate from a hydraulic pressure value required to achieve the target input revolution speed (the target transmission ratio) by receiving disturbance etc. and this will affect a correct transmission control. In order to prevent this possibility, the following feedback control system is added.

That is, a hydraulic pressure sensor 10 that detects the movable sheave surface pressing hydraulic pressure of the secondary pulley 2 is provided, and a value of a detected movable sheave surface pressing hydraulic pressure by this hydraulic pressure sensor 10 is returned to the transmission control circuit 6 as a feedback control.

The transmission control circuit 6 calculates as to how much the feedback value of the movable sheave surface pressing hydraulic pressure of the secondary pulley 2 deviates from a command value of the transmission control pressure Pc required to achieve the target input revolution speed (the target transmission ratio), and varies the command value of the transmission control pressure Pc so as to cancel this deviation.

With this feedback, even when receiving the disturbance etc., the transmission control pressure Pc is controlled so that the transmission control pressure Pc does not deviate from the hydraulic pressure value required to achieve the target input revolution speed (the target transmission ratio), and the correct transmission control can be achieved all the time.

The transmission control circuit 6 further produces a starting frictional element engagement pressure Ps that controls engagement of the starting frictional element F/E with the line pressure $P_L$ being the source pressure, and supplies this starting frictional element engagement pressure Ps to the starting frictional element F/E via a starting element engagement pressure oil passage 17.

Here, the starting frictional element engagement pressure Ps is controlled to such hydraulic pressure value that the starting frictional element F/E is engaged with the starting frictional element F/E having torque capacity which is capable of transmitting the input torque inputted to the primary pulley 1.

In the present embodiment, the engine E to which the primary pulley 1 connects is an engine having an engine automatic-stop control device for the purpose of improving fuel economy. The engine automatic-stop control device automatically stops the engine (i.e. executes idle stop) when the vehicle is in a vehicle stop judgment state in which the vehicle speed is less than an infinitesimal setting vehicle speed used for the vehicle stop judgment and predetermined conditions are satisfied, e.g. this vehicle stop judgment state continues for a setting time without an intention of starting the vehicle.

With respect to cancel of the engine automatic-stop control, when an operation which is considered as driver's intention to start the vehicle is performed, e.g. when a brake pedal is released and a braking state is changed from a working state to a non-working state, the engine is automatically started and the cancel of the engine automatic-stop control is carried out.

Here, during execution of the engine automatic-stop control (during the idle stop), since the engine is not running, there is no discharge fluid from the engine-driven oil pump 4 driven by the engine, and the line pressure $P_L$ cannot be generated, also the transmission control circuit 6 cannot produce the transmission control pressure Pc and the starting frictional element engagement pressure Ps.

Thus, the V-belt 3 cannot be pressed between the opposing sheave surfaces of the primary pulley 1 and the secondary pulley 2. Further, the starting frictional element F/b cannot be engaged. Because of this, during execution of the engine automatic-stop control, the V-belt-drive CVT is in a state incapable of transmitting the power.

When the engines started from this state by cancel of the engine automatic-stop control, the working fluid is discharged from the engine-driven oil pump 4 driven by this engine start, and this allows the line pressure $P_L$ to be generated. Also, since this engine start allows the transmission control circuit 6 to produce the transmission control pressure Pc and the starting frictional element engagement pressure Ps, the V-belt-drive CVT becomes in a state capable of transmitting the power by the generation of these hydraulic pressures.

However, there is a delay of response to discharge the working fluid by the engine-driven oil pump 4 by the engine start by the cancel of the engine automatic-stop control and to generate the line pressure $P_L$, the transmission control pressure Pc and the starting frictional element engagement pressure Ps and to bring the V-belt-drive CVT to the power transmission-capable state, and this not only deteriorates a vehicle restart response, but also there arises a problem that a restart shock occurs due to engine RPM surge or engine flare-up or this adversely affects durability of the transmission.

Accordingly, in the present embodiment, during execution of the engine automatic-stop control, an electric oil pump 11 is operated instead of the engine-driven oil pump 4, and as will be described below, the V-belt-drive CVT is kept in a power transmission starting state that is a state just before starting to transmit the power by working fluid from the electric oil pump 11.

Here, the electric oil pump 11 is driven by a dedicated motor 12. The dedicated motor 72 is a motor that has a minimum power for driving the electric oil pump 11.

An outlet port of the electric oil pump 11 is connected with the line pressure oil passage 5 via an electric oil pump oil passage 13.

A check valve 14, which is set in a direction that prevents an oil flow from the line pressure oil passage 5 into the electric oil pump oil passage 13, is provided in the electric oil pump oil passage 13.

This check valve 14 is a valve that prevents a situation in which when the working fluid is discharged from the engine-driven oil pump 4, this working fluid flows toward the oil pan and leaks through the electric oil pump 11 then the line pressure $P_L$ cannot be generated.

With the above system, during execution of the engine automatic-stop control, the transmission control circuit 6 can generate, in a transmission control oil passage including the oil passages 5, 9, 17, the hydraulic pressures that keep the transmission (the V-belt-drive CVT) in the power transmission starting state with the working fluid from the electric oil pump 11 being the medium, as follows.

That is, the transmission control circuit 6 can generate the hydraulic pressures that press the V-belt 3 between the opposing sheave surfaces of the primary pulley 1 and between the opposing sheave surfaces of secondary pulley 2 without looseness, in the oil passages 5, 9.

Also, the transmission control circuit 6 can generate the hydraulic pressure required to keep the starting frictional element F/E (the forward clutch and the reverse brake provided in the forward/reverse changing mechanism) in a state in which the starting frictional element F/E is just about to begin to have engagement capacity against a built-in return spring, in the oil passage 17.

Then, with this, the V-belt-drive CVT can be kept in the power transmission starting state that is the state just before starting to transmit the power.

Consequently, the transmission control circuit 6 can increase the transmission control pressure from the above power transmission starting state achieving pressure value generated with the working fluid from the electric oil pump 11 being the medium to the hydraulic pressure value that brings the transmission (the V-belt-drive CVT) to the power transmission-capable state, with the working fluid from the engine-driven oil pump 4 being the medium, instantly after the engine is restarted by the cancel of the engine automatic-stop control.

Therefore, the V-belt-drive CVT can transmit the power just after the engine start without an occurrence of slip, and the vehicle restart response can be improved, also the problem such as the occurrence of the restart shock due to engine RPM surge or engine flare-up and the adverse effect on the durability of the transmission can be prevented.

Here, upon failure of the electric oil pump 11, i.e. when the electric oil pump 11 cannot discharge the working fluid or its discharge oil amount is less than a discharge oil amount that keeps the V-belt-drive CVT in the power transmission starting state clue to failure of the electric oil pump 11 or the dedicated motor 12 or failure of a motor power system or a control system, the V-belt-drive CVT cannot be kept in the power transmission starting state during execution of the engine automatic-stop control. And not only a primary object such as the improvement of the restart response cannot be achieved, but also the restart shock occurs due to engine RPM surge or engine flare-up and the adverse effect on the durability of the transmission occurs. Thus, at the failure of the electric oil pump 11, it is desirable to forbid the engine automatic-stop control.

In order to meet this requirement, a failure judgment of the electric oil pump 11 is carried out. Further, in order to perform ON/OFF control of the engine automatic-stop control (the idle stop) and ON/OFF control of the electric oil pump 11 (the dedicated motor 12), in the present embodiment, an engine automatic-stop controller 15 shown in FIG. 1 is provided.

The engine automatic-stop controller 15 inputs signals from an idle stop permission condition detection section 16 and the hydraulic pressure sensor 10.

Figure 3:
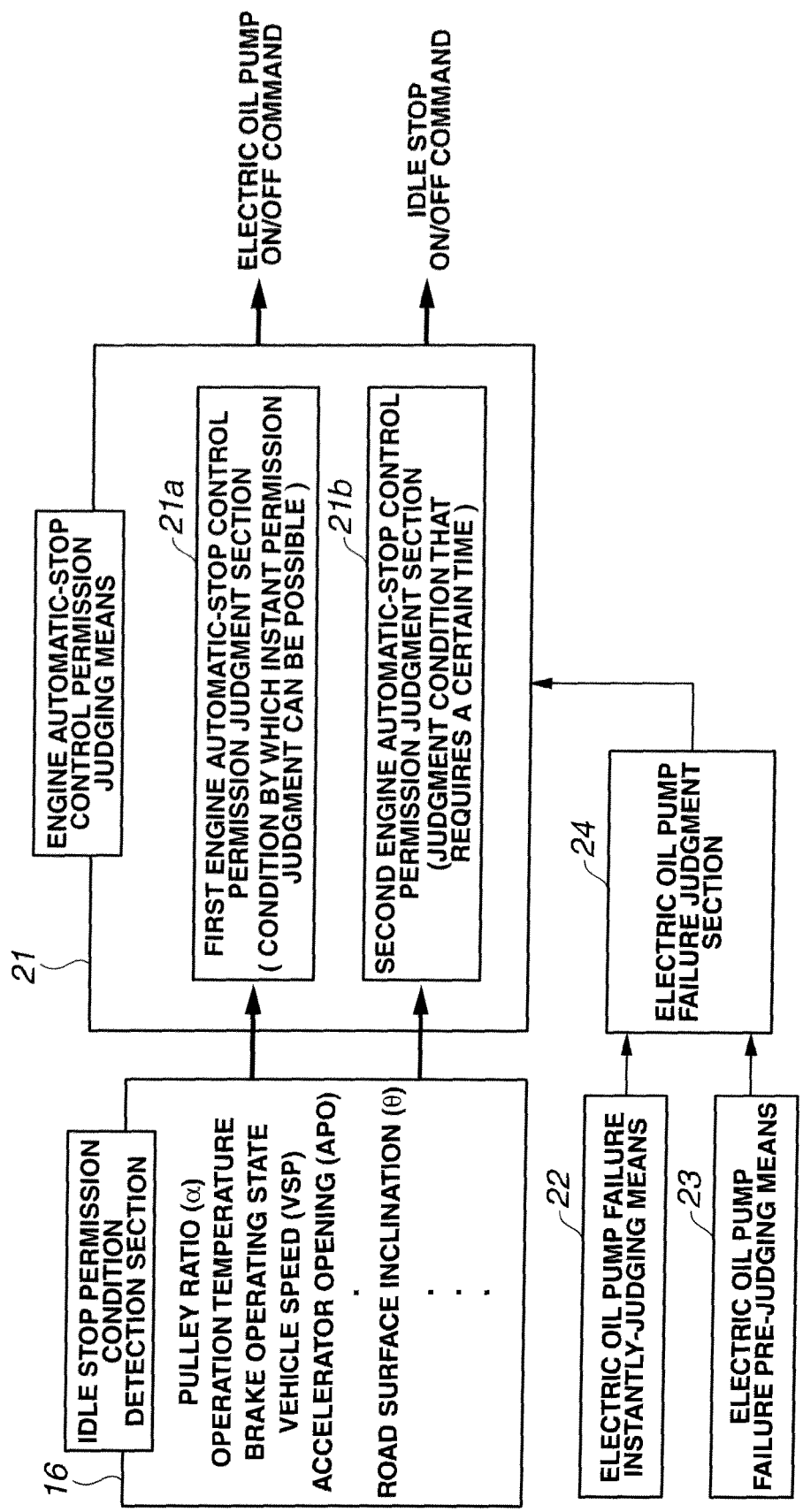
FIG. 3 is a block diagram divided by function, about an idle stop control section in the engine automatic-stop controller in FIG. 1.

As idle stop permission conditions which the idle stop permission condition detection section 16 detects, as shown in FIG. 3, they are a pulley ratio α that is a rotation speed ratio between the pulleys 1 and 2 of the V-belt-drive CVT, an operation temperature of the transmission, a brake operating state, the vehicle speed VSP, an accelerator opening APO and an inclination θ of road surface at which the vehicle stops, etc.

Regarding an idle stop permission condition concerning the pulley ratio α, the idle stop is permitted with the proviso that the pulley ratio α is a pulley ratio that is in an area near a lowest transmission ratio.

Regarding an idle stop permission condition concerning the operation temperature of the transmission, the idle stop is permitted with the proviso that the transmission operation temperature is temperature that is in a temperature region after finishing an engine warm-up operation.

Regarding an idle stop permission condition concerning the brake operating state, the idle stop is permitted with the proviso that the brake is in an operating (or working) state.

Regarding an idle stop permission condition concerning the vehicle speed VSP, the idle stop is permitted with the proviso that the vehicle speed VSP is a value that is in a range near zero.

Regarding an idle stop permission condition concerning the accelerator opening APO, the idle stop is permitted with the proviso that the accelerator opening APO is a value that is in an area near zero.

Regarding an idle stop permission condition concerning the inclination θ of road surface at which the vehicle stops, the idle stop is permitted with the proviso that the inclination θ is an inclination of a flat road which is an inclination near zero.

Figure 2:
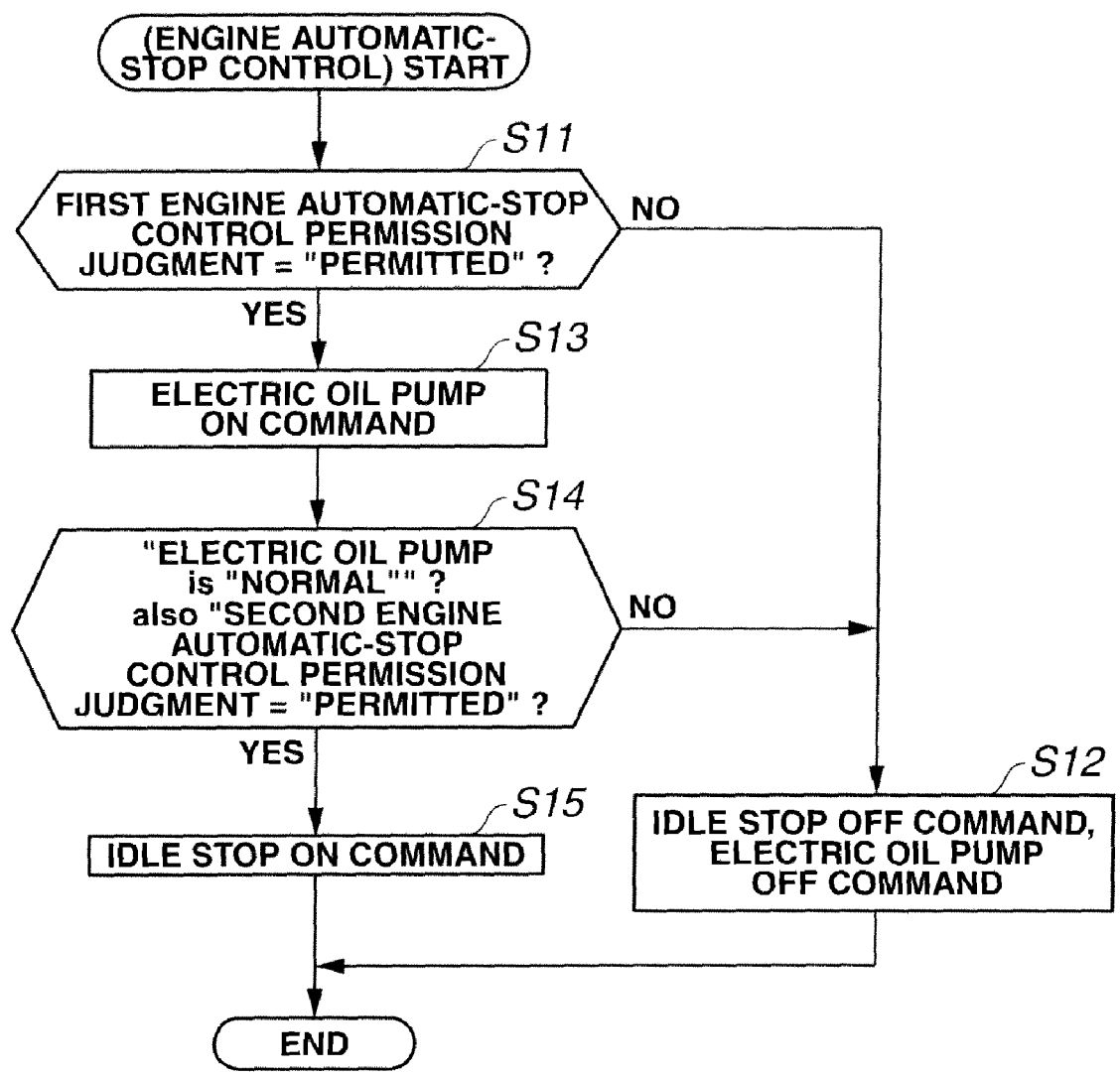
FIG. 2 is a flowchart showing an idle stop control program executed by an engine automatic-stop controller in FIG. 1.

The engine automatic-stop controller 15 executes a control program shown in FIG. 2 on the basis of the above input information, and performs an operation according to a block diagram shown in FIG. 3.

By executing the control program and performing the operation, the engine automatic-stop controller 15 carries out the failure judgment of the electric oil pump 11 and performs the ON/OFF control of the engine automatic-stop control (the idle stop) and the ON/OFF control of the electric oil pump 11 (the dedicated motor 12), as follows.

In FIG. 2, at step S11 (in a first engine automatic-stop control permission judgment section 21a in an engine automatic-stop control permission judging means 21 in FIG. 3), a first engine automatic-stop control permission judgment is carried out on the basis of the idle stop permission conditions (the pulley ratio α, the transmission operation temperature, the brake operating state, the vehicle speed VSP and the accelerator opening APO) which can be instantly detected and by which an instant permission judgment of the engine automatic-stop control can be possible by only a judgment as to whether each detection value is in an idle stop permission area (region or range) or not, from among the idle stop permission conditions of the pulley ratio α, the transmission operation temperature, the brake operating state, the vehicle speed VSP, the accelerator opening APO and the road surface inclination θ detected by the detection section 16 (also see FIG. 3). By this first engine automatic-stop control permission judgment, it is judged whether the engine automatic-stop control (the idle stop) should be permitted or forbidden.

If the first engine automatic-stop control permission judgment, based on the conditions by which the instant permission judgment can be possible at step S11 (in the first engine automatic-stop control permission judgment section 21a), is not "permitted" (i.e. "forbidden"), the engine automatic-stop controller 15 in FIG. 1 outputs an idle stop OFF command to an engine side and outputs an electric oil pump OFF command to the electric oil pump 11 (the dedicated motor 12) (by the engine automatic-stop control permission judging means 21 in FIG. 3) at step S12 in FIG. 2.

If the first engine automatic-stop control permission judgment, based on the conditions by which the instant permission judgment can be possible at step S11 (in the first engine automatic-stop control permission judgment section 21a), is "permitted", the engine automatic-stop controller 15 in FIG. 1 outputs (issues) an electric oil pump ON command (an electric oil pump test drive command) to the electric oil pump 11 (the dedicated motor 12) first before a decision of the idle stop ON/OFF command (by the engine automatic-stop control permission judging means 21 in FIG. 3) at step S13 in FIG. 2.

At step S14 (in an electric oil pump failure judgment section 24 in FIG. 3), a failure judgment of the electric oil pump 11 (the dedicated motor 12) is carried out as follows.

That is, an electric oil pump failure instantly-judging means 22 in FIG. 3 judges a failure of an electric system etc. which can be judged instantly by electrical troubleshooting or electrical failure check, such as breakage (disconnection) in the power system or the control system relating to the electric oil pump 11 (the dedicated motor 12).

And an electric oil pump failure pre-judging means (or an electric oil pump failure prior judging means) 23 in FIG. 3 judges a foreign matter-biting failure which is caused by the fact that the electric oil pump 11 bites the foreign matter having gotten into the working fluid, from a hydraulic pressure detection value by the hydraulic pressure sensor 10 (see FIG. 1). That is, the electric oil pump failure pre-judging means 23 judges as to whether the electric oil pump 11 cannot actually be driven even by receiving the electric oil pump test drive command at step S13 in a case where the dedicated motor 12 is a low power motor.

Here, regarding the latter foreign matter-biting failure judgment of the electric oil pump 11 by the electric oil pump failure pre-judging means 23, the electric oil pump failure pre-judging means 23 judges as to whether or not the electric oil pump 11 is actually rotated in response to the test drive command by checking the presence or absence of a hydraulic pressure which occurs by the drive (rotation) of the electric oil pump 11. Because of this, this judgment cannot be carried out instantly, and it takes a certain time for this failure judgment.

At step 314 (in the electric oil pump failure judgment section 24 in FIG. 3), when a failure judgment result of the electric system etc. by the electric oil pump failure instantly-judging means 22 and a foreign matter-biting failure judgment result of the electric oil pump 11 by the electric oil pump failure pre-judging means 23 are both "no failure", the electric oil pump 11 is judged to be "normal".

When at least either one of the failure judgment result of the electric system etc. by the electric oil pump failure instantly-judging means 22 and the foreign matter-biting failure judgment result of the electric oil pump 11 by the electric oil pump failure pre-judging means 23 is "failure", the electric oil pump 11 is judged to be "failed".

Further, at step S14, a second engine automatic-stop control permission judgment is carried out as follows.

Regarding this judgment, in a second engine automatic-stop control permission judgment section 21b in the engine automatic-stop control permission judging means 21 in FIG. 3, a second engine automatic-stop control permission judgment is carried out on the basis of the idle stop permission conditions which cannot be instantly detected and by which the instant permission judgment of the engine automatic-stop control cannot be possible because even if the instant detection of the idle stop permission conditions is possible, it is not possible to instantly judge whether or not the detection values satisfy the respective idle stop permission conditions, from among the idle stop permission conditions detected by the idle stop permission condition detection section 16 (also see FIG. 1).

As the idle stop permission condition by which the instant permission judgment of the engine automatic-stop control cannot be possible, for instance, it is the vehicle stop road surface inclination θ.

Figure 4:
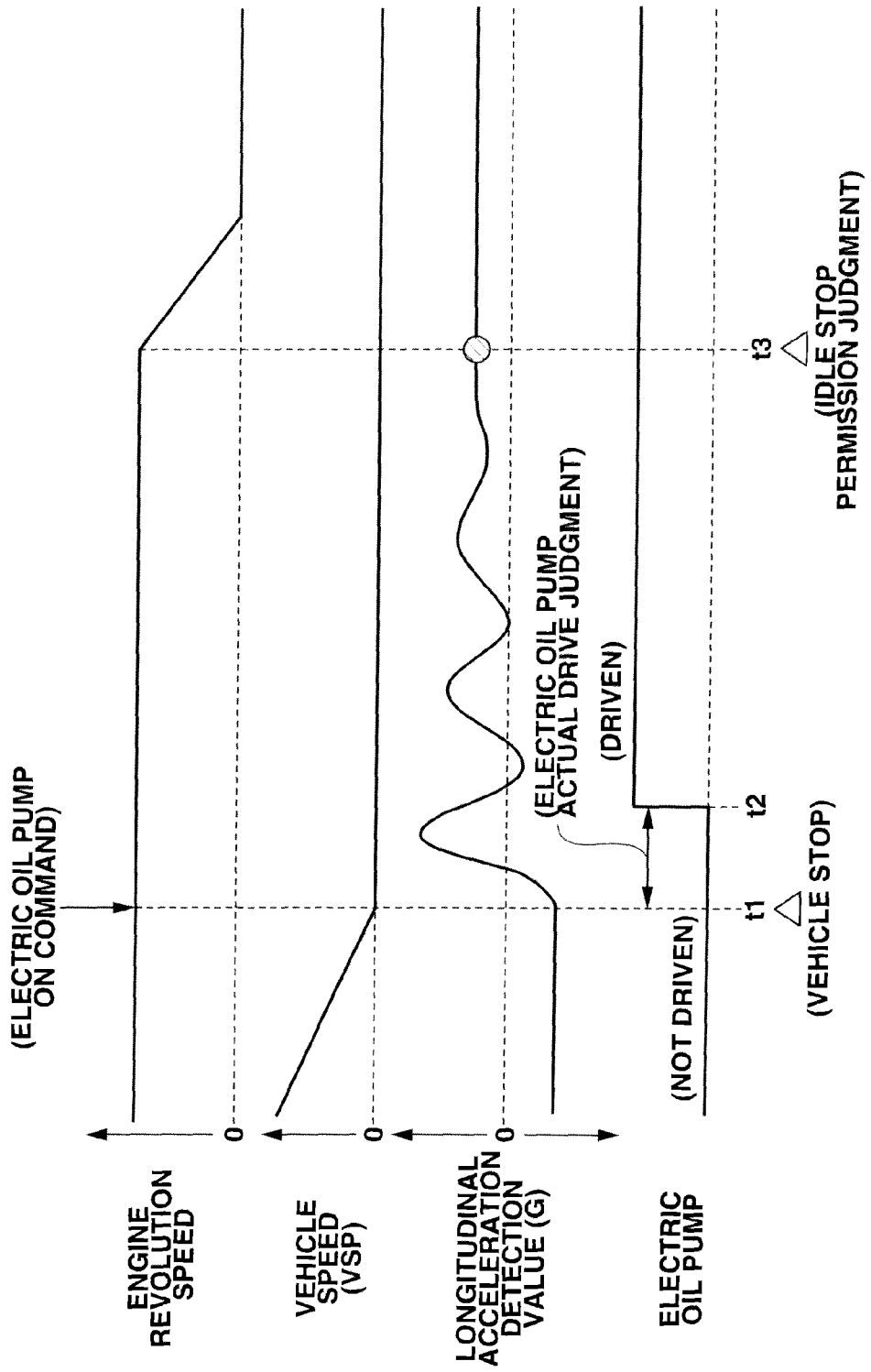
FIG. 4 is a time chart showing time-series change, just after a vehicle stop, of a detection value of a vehicle longitudinal acceleration sensor, used for determining inclination of road surface at which the vehicle stops.

The vehicle stop road surface inclination θ is detected from a longitudinal acceleration detection value G that is detected by a longitudinal acceleration sensor provided in the vehicle. However, as shown in FIG. 4, this longitudinal acceleration detection value G is in a transient state in which the longitudinal acceleration detection value G oscillates due to elastic behavior etc. of a suspension system during a period of time from a vehicle stop time t1 at which the vehicle speed VSP becomes zero to a time t3 that is a time after a lapse of a certain period of time. Because of this, the vehicle stop road surface inclination θ cannot be read from the oscillating longitudinal acceleration detection value G just after the vehicle stop.

Thus, the vehicle stop road surface inclination θ can be read from the longitudinal acceleration detection value G only after the oscillation of the longitudinal acceleration detection value G disappears and settles down and the longitudinal acceleration detection value G is in a steady state at time t3. Then in a case where this vehicle stop road surface inclination θ falls within an engine automatic-stop control permission range, the idle stop permission is judged and the en automatic-stop control that brings an engine revolution speed to zero can be executed.

As is clear from this, the instant permission judgment of the engine automatic-stop control cannot be possible by the vehicle stop road surface inclination θ. The permission judgment of the engine automatic-stop control based on this vehicle stop road surface inclination θ requires a judgment time from time t1 to time t3.

Therefore, in the present embodiment, for example, at time t1 of the period of time from time t1 to time t3 during which the second engine automatic-stop control permission judgment, based on the idle stop permission conditions, typified by the vehicle stop road surface inclination θ, by which the instant permission judgment of the engine automatic-stop control cannot be possible, is being carried out in the judgment section 21b in FIG. 3, the failure judgment of the electric system etc. by the electric oil pump failure instantly-judging means 22 (see FIG. 3) and the foreign matter-biting failure judgment (the judgment as to whether the electric oil pump 11 is actually driven in response to the test drive command at step S13) by the electric oil pump failure pre-judging means 23 (see FIG. 3) also a final failure judgment of the electric oil pump 11 carried out on the basis of these failure judgment results by the electric oil pump failure judgment section 24 (see FIG. 3) at step S14 are initiated.

At time t2 at which the drive (rotation) of the electric oil pump 11 in response to the test drive command actually starts, the final judgment of "the electric oil pump 11 is "normal"" is made.

At step S14, if a result of the final failure judgment of the electric oil pump 11 by the electric oil pump failure judgment section 24 (see FIG. 3) is "the electric oil pump 11="normal"" and also a result of the engine automatic-stop control permission judgment, based on the idle stop permission condition (the vehicle stop road surface inclination θ) by which the instant judgment cannot be possible, by the second engine automatic-stop control permission judgment section 21b (see FIG. 3) is "the engine automatic-stop control is "permitted"", the engine automatic-stop control (the idle stop) should be permitted and the control (routine) proceeds to step S15.

If at least either one of the above two requirements is not satisfied, i.e. if "the electric oil pump 11="failure"" or "the engine automatic-stop control="not permitted"", the engine automatic-stop control (the idle stop) should not be permitted and the routine proceeds to step S12.

When judging that the engine automatic-stop control (the idle stop) should be permitted at step S14, the engine automatic-stop controller 15 in FIG. 1 outputs the idle stop ON command to the engine side (by the engine automatic-stop control permission judging means 21 in FIG. 3) at step S15 in FIG. 2, and automatically stops the engine.

Here, rice the electric oil pump ON command is already outputted to the electric oil pump 11 (the dedicated motor 12) at step S13, the electric oil pump 11 continues being driven also after the test drive (test rotation). Then, as previously explained above, by the working fluid from the electric oil pump 11, the V-belt-drive CVT can be kept in the power transmission starting state also after the idle stop.

When judging that the engine automatic-stop control (the idle stop) should not be permitted at step S14, the engine automatic-stop controller 15 in FIG. 1 outputs the idle stop OFF command to the engine side (by the engine automatic-stop control permission judging means 21 in FIG. 3) at step S12 in FIG. 2, and does not allow the execution of the idle stop that automatically stops the engine. Simultaneously, the engine automatic-stop controller 15 outputs the electric oil pump OFF command to the electric oil pump 11 (the dedicated motor 12), and cancels the test drive command of the electric oil pump 11 outputted at step S13.

In the following description, a time-series operating action of the above embodiment will be explained with reference to FIG. 5.

At a vehicle stop judgment time t1, the first engine automatic-stop control permission judgment, based on the engine automatic-stop control permission conditions by which the instant permission judgment can be possible, is carried out (at step S11, in the first engine automatic-stop control permission judgment section 21a). If this judgment result is "permitted", the electric oil pump ON (drive) command (the test drive command) is instantly outputted (at step S13, in the engine automatic-stop control permission judging means 21).

When the result of the first engine automatic-stop control permission judgment is "permitted", further, at this permission judgment time t1, the second engine automatic-stop control permission judgment, based on the idle op permission conditions by which the instant permission judgment of the engine automatic-stop control cannot be possible, is also started (at step S14, in the second engine automatic-stop control permission judgment section 21b).

However, as explained above using FIG. 4, this permission judgment requires the permission judgment time, thus the second engine automatic-stop control permission judgment does not end until time t3.

When the result of the first engine automatic-stop control permission judgment is "permitted", further, at this permission judgment time t1, the failure judgment of the electric system etc. relating to the electric oil pump 11 (the dedicated motor 12) (at step S14, in the electric oil pump failure instantly-judging means 22) is carried out, also the oil pump actual drive judgment that judges as to whether the electric oil pump 11 is actually driven in response to the test drive command at time t1, i.e. the drive-incapable judgment by the foreign matter-biting of the electric oil pump 11, is initiated (at step S14, in electric oil pump failure pre-judging means 23).

Simultaneously, the final failure judgment of the electric oil pump 11 made on the basis of these failure judgment results is initiated (at step S14, in the electric oil pump failure judgment section 24).

The former failure judgment of the electric system etc. relating to the electric oil pump 11 (the dedicated motor 12) (at step S14, in the electric oil pump failure instantly-judging means 22) is completed at the same time as the execution of the failure judgment at time t1

However, the latter foreign matter-biting failure judgment of the electric oil pump 11 ends at time t2 at which the actual drive of the electric oil pump 11 in response to the test drive command takes place after receiving the test drive command (at step S13) at time t1.

Therefore, the final failure judgment (at step S14, in the electric oil pump failure judgment section 24), which judges that, on the basis of these former and latter judgment results, the electric oil pump 11 is "normal" when these judgment results are "no failure", ends also at time t2 at which the actual drive judgment of the electric oil pump 11 ends.

When the second engine automatic-stop control permission judgment (at step S14, in the second engine automatic-stop control permission judgment section 21b), based on the idle stop permission conditions by which the instant permission judgment of the engine automatic-stop control cannot be possible, ends at time t3 and its judgment result is "permitted", since the final failure judgment (at step S14, in the electric oil pump failure judgment section 24) of "the electric oil pump 11 is "normal"" is already made at time t2, in response to the establishment of these both judgment results, the engine automatic-stop control (the idle stop) should be permitted and the idle stop ON command is outputted (at step S15, in the engine automatic-stop control permission judging means 21).

On the other hand, regarding the electric oil pump ON (drive) command (the test drive command) (at step S13, in the engine automatic-stop control permission judging means 21) outputted at time t1, since the judgment result by the second engine automatic-stop control permission judgment (at step S14, in the second engine automatic-stop control permission judgment section 21b) at time t3 is "permitted" and also the final failure judgment (at step S14, in the electric oil pump failure judgment section 24) of the electric oil pump 11 at the same time t3 is "normal", the output of the electric oil pump ON (drive) command (the test drive command) is continued also after time t3.

Thus, the electric oil pump 11 continues being driven by the dedicated motor 12 also after time t3 of the engine automatic-stop (the idle stop), and by the working fluid from this electric oil pump 11, the V-belt-drive CVT can be kept in the power transmission starting state.

The operation explained using FIG. 5 is the operation of the case where the result of the first engine automatic-stop control permission judgment is "permitted" and the result of the second engine automatic-stop control permission judgment is also "permitted" and further the final failure judgment of the electric oil pump 11 is "normal".

In the present embodiment, before time t3 at which the engine stop by the engine automatic-stop control is carried out, the pump test drive command is outputted to the dedicated motor 12 of the electric oil pump 11 and the failure of the electric oil pump 11 is judged by the judgment as to whether the electric oil pump 11 is actually driven in response to this test drive command.

Hence, even the failure caused by the drive-incapable state by the foreign matter-biting of the electric oil pump 11, in the case where the motor 12 is the low power motor because of the dedicated motor, can surely be judged.

Consequently, the present embodiment can avoid the following problems that, not only the primary object such as the improvement of the restart response cannot be achieved, but also the great restart shock and the adverse effect on the transmission occur, which is caused by the fact that the drive-incapable judgment by the foreign matter-biting of the electric oil pump 11 is impossible and this allows the execution of the engine automatic-stop control (the idle stop).

In addition, in the present embodiment, before time t3 of the engine stop (the idle stop) by the engine automatic-stop control, the pump test drive command is issued to the dedicated motor 12 of the electric oil pump 11 and the failure judgment as to whether the electric oil pump 11 is actually driven in response to this test drive command is carried out.

Therefore, this failure judgment is already completed at time t3 at which the engine stop by the engine automatic-stop central should be initiated. Thus the above-mentioned operation and effects can be achieved without delay of a timing t3 of the initiation of the engine stop by the engine automatic-stop control.

Here, in the conventional engine automatic-stop control (idle stop) disclosed in Patent Document 1, as mentioned above, when the electric system such as power system or the control system relating to the electric oil pump is "normal", even if the electric oil pump becomes incapable of drive by the foreign matter-biting, as shown in FIG. 6, a judgment of "the electric oil pump failure judgment is always "normal"" is made.

For this reason, in a case where the engine automatic-stop control permission judgment initiated at vehicle stop judgment time t1 ends at time t2 and this judgment result is "permitted", the idle stop ON command is outputted then the engine stop is carried out also the electric oil pump ON command is outputted then the drive of the electric oil pump is commanded, at this time t2.

On the other hand, in the system in which the electric oil pump 11 is driven by the low power dedicated motor 12 such as the system to which the present invention is applied, if the electric oil pump bites the foreign matter, the electric oil pump cannot be driven by the dedicated motor.

In this case, the electric oil pump is not driven even by the electric oil pump ON command (the electric oil pump drive command) at time t2, and cannot discharge the working fluid due to the drive-incapable state. Because of this, the V-belt-drive CVT cannot be kept in the power transmission starting state during the execution of the idle stop.

In this condition, despite the fact that the V-belt-drive CVT is not in the power transmission starting state because of the electric oil pump drive-incapable state by the foreign matter-biting, if the engine automatic-stop control (the idle stop) is executed, not only the primary object such as the improvement of the restart response cannot be achieved, but also the great restart shock and the adverse effect on the transmission occur at the restart by the cancel of the engine automatic-stop control (the idle stop).

However, according to the present embodiment, these problems can be avoided by the above-mentioned operation.

Here, for reference purposes, an operating action of a case where, an operation by which the drive-incapable state of the electric oil pump by the foreign matter-biting is judged by the same manner as the present embodiment is added to FIG. 6, will be explained with reference to FIG. 7.

At time t2 in FIG. 7, same as the operation at time t2 in FIG. 6, in a case where the engine automatic-stop control permission judgment ends and this judgment result is "permitted", the drive of the electric oil pump is commanded by the electric oil pump ON command at this time t2.

At time t3 at which the drive of the electric oil pump actually starts in response to this electric oil pump ON command, the electric oil pump failure judgment is changed from "unknown" to "normal", and by both of "normal" of the electric oil pump failure judgment result and "permitted" of the engine automatic-stop control permission judgment result, the idle stop ON command is outputted then the engine stop is carried out.

In this case, the foreign matter-biting failure judgment of the electric oil pump is carried out during a period of time from time t2 to time t3. If the electric oil pump is in the drive-incapable state due to the foreign matter-biting, since the electric oil pump failure judgment remains "unknown", the idle stop ON command is not outputted.

Therefore, it is possible to avoid the occurrence of the situation in which despite the fact that the electric oil pump is in the drive-incapable state due to the foreign matter-biting, the engine automatic-stop control (the idle stop) is carried out and the above problems occur.

In the case of FIG. 7, however, whereas the initiation of the idle stop is the time t2 in FIG. 6, the idle stop of FIG. 7 is not initiated until time t3 which is later than time t2, and this gives rise to a problem that a fuel economy improvement effect is reduced by delay of the initiation of the idle stop.

Therefore, in the present embodiment, as described using FIG. 5, in order to complete the actual drive judgment of the electric oil pump 11 in response to the test drive command before time t3 at which the engine stop (the idle stop) by the engine automatic-stop control is carried out, this judgment is already completed at time t3 at which the engine stop by the engine automatic-stop control should be initiated. As a consequence, the above-mentioned operation and effects can be achieved without delay of the timing t3 of the initiation of the engine stop by the engine automatic-stop control.

Consequently, according to the present embodiment, the problems that bring about the occurrence of the delay of the initiation of the idle stop mentioned above using FIG. 7 and the reduction of the fuel economy improvement effect do not arise.

Further, in the present embodiment, after "permitted" of the judgment result by the first engine automatic-stop control permission judgment (at step S11, in the first engine automatic-stop control permission judgment section 21a) is outputted, the foreign matter-biting failure judgment (at step S14, in electric oil pump failure pre-judging means 23) by the test drive (at step S13) of the electric oil pump 11 is performed.

Thus, the foreign matter-biting failure judgment of the electric oil pump 11 is carried out after a first condition of the initiation of the engine automatic-stop control (the idle stop) is satisfied.

Then, the foreign matter-biting failure judgment can be carried out only in the case where this judgment is needed, and an increase in power loss by the fact that this judgment is carried out in vain can be prevented.

Furthermore, during the period of time in which the second engine automatic-stop control permission judgment (at step S14, in the second engine automatic-stop control permission judgment section 21b) is being carried out after the output of the "permitted" of the judgment result by the first engine automatic-stop control permission judgment (at step S11, in the first engine automatic-stop control permission judgment section 21a), the foreign matter-biting failure judgment (at step S14, in electric oil pump failure pre-judging means 23) by the test drive (at step S13) of the electric oil pump 11 is performed.

Thus, during the progress of the judgment of the second engine automatic-stop control permission judgment which takes a certain time, the foreign matter-biting failure judgment by the test drive of the electric oil pump 11, which also takes a certain time, can be completed.

Then, the timing of the initiation of the engine stop (the idle stop) by the engine automatic-stop control is not delayed by the foreign matter-biting failure judgment by the test drive of the electric oil pump 11 which requires a relatively long time.

Hence, in the present embodiment, even though the foreign matter-biting failure judgment by the test drive of the electric oil pump 11 is added, this does not bring about the delay of the initiation of the idle stop, and also the problem of the reduction of the fuel economy improvement effect caused by this delay does not arise.

Moreover, according to the present embodiment, the permission judgment by the first engine automatic-stop control permission judgment (at step S11, in the first engine automatic-stop control permission judgment section 21a) is carried out by the judgment as to whether in the idle stop permission conditions (e.g. the pulley ratio α, the transmission operation temperature, the brake operating state, the vehicle speed VSP and the accelerator opening APO) by which the instant permission judgment can be possible fall within the permission range (area or region) or not.

Also, the second engine automatic-stop control permission judgment (at step S14, in the second engine automatic-stop control permission judgment section 21b) is carried out by the judgment as to whether the idle stop permission conditions (e.g. the vehicle stop road surface inclination θ) by which the instant permission judgment cannot be possible fall within the permission range or not, after the vehicle settles down from a transient state to a steady state just after the vehicle stop.

Thus, the engine automatic-stop control permission judgment can be made with the idle stop permission conditions by which the instant permission judgment can be possible and the idle stop permission conditions by which the instant permission judgment cannot be possible separated from each other.

Consequently, when the result of the first engine automatic-stop control permission judgment by which the instant permission judgment can be possible is "not permitted", no permission of the engine automatic-stop control (the idle stop) is commanded without waiting for the second engine automatic-stop control permission judgment which requires a certain time to end, then it is possible to instantly stop the initiation of this engine automatic-stop control (the idle stop).

Here, as described above and shown in the drawings, in the case where the idle stop permission condition which requires a certain time is the vehicle stop road surface inclination θ that is determined from the longitudinal acceleration detection value G detected by the longitudinal acceleration sensor provided in the vehicle, although this longitudinal acceleration detection value G oscillates for a relatively long time just after the vehicle stop, as mentioned using FIG. 4, the engine automatic-stop control (the idle stop) can be achieved accurately without being affected by this oscillation.

In the above description, the case where the transmission is the V-belt-drive CVT is described. However, as a matter of course, also in a case where the transmission is a multi-range or stepwise variable transmission or an automatic manual transmission whose shift is automatically changed, the same operation and effects can be obtained.

EXPLANATION OF REFERENCE SIGN

E engine
T/C torque converter
F/E starting frictional element
1 primary pulley
2 secondary pulley
3 V-belt
4 engine-driven oil pump
5 line pressure oil passage
6 transmission control circuit
7 operation state detecting means
8 primary pulley pressure oil passage
9 transmission control pressure oil passage
10 hydraulic pressure sensor
11 electric oil pump
12 dedicated motor
13 electric oil pump oil passage
14 check valve
15 engine automatic stop controller
16 idle stop permission condition detection section
17 starting element engagement pressure oil passage
21 engine automatic-stop control permission judging means
21a first engine automatic-stop control permission judgment section
21b second engine automatic-stop control permission judgment section
22 electric oil pump failure instantly-judging means
23 electric oil pump failure pre-judging means
24 electric oil pump failure judgment section

The invention claimed is:

1. An engine automatic-stop control device with a failure judgment apparatus of an electric oil pump for a vehicle, the vehicle having a transmission which is controlled by hydraulic pressure from an engine-driven oil pump driven by an engine during engine operation, comprising:
an electric oil pump which is driven by a dedicated motor and by working fluid of which, the transmission is kept in a power transmission starting state that is a state just before starting to transmit power, upon an engine automatic-stop, instead of the engine-driven oil pump;
an engine automatic-stop controller which automatically stops the engine, upon a judgment of vehicle stop, when predetermined conditions are satisfied, and issues a pump test drive command to the dedicated motor before the engine stop by the engine automatic-stop control;
an engine automatic-stop control permission judging means that judges whether the predetermined conditions which permit the engine automatic-stop control are satisfied or not, the engine automatic-stop control permission judging means having
(a) a first engine automatic-stop control permission judgment section that judges the permission of the engine automatic-stop control by a judgment as to whether conditions by which an instant permission judgment can be possible, from among the predetermined conditions, are satisfied or not; and
(b) a second engine automatic-stop control permission judgment section that judges the permission of the engine automatic-stop control by a judgment as to whether conditions which require a certain time for the permission judgment, from among the predetermined conditions, are satisfied or not; and
an electric oil pump failure pre-judging means which judges failure of the electric oil pump by a judgment as to whether the electric oil pump is actually driven in response to the pump test drive command, and
the electric oil pump failure pre-judging means executing the test drive of the electric oil pump, during the progress of the permission judgment of the engine automatic-stop control by the second engine automatic-stop control permission judgment section after the first engine automatic-stop control permission judgment section permits the engine automatic-stop control.

2. The engine automatic-stop control device with the failure judgment apparatus of the electric oil pump for the vehicle, as claimed in claim 1, wherein:
when the first engine automatic-stop control permission judgment section permits the engine automatic-stop control by the conditions by which the instant permission judgment can be possible, the electric oil pump continues being driven from the test drive.

3. The engine automatic-stop control device with the failure judgment apparatus of the electric oil pump for the vehicle, as claimed in claim 1, wherein:
when the first engine automatic-stop control permission judgment section does not permit the engine automatic-stop control by the conditions by which the instant permission judgment can be possible, the test drive and a subsequent drive of the electric oil pump are not carried out.

4. The engine automatic-stop control device with the failure judgment apparatus of the electric oil pump for the vehicle, as claimed in claim 1, wherein:
when the first engine automatic-stop control permission judgment section does not permit the engine automatic-stop control by the conditions by which the instant permission judgment can be possible, the permission judgment of the engine automatic-stop control by the second engine automatic-stop control permission judgment section is not carried out.

5. The engine automatic-stop control device with the failure judgment apparatus of the electric oil pump for the vehicle, as claimed in claim 1, wherein:
before judging the failure of the electric oil pump by the test drive of the electric oil pump, an electrical failure check of the electric oil pump and this judgment are carried out, and
when at least either one of these judgment results is failure, the electric oil pump is judged to be failed.

6. The engine automatic-stop control device with the failure judgment apparatus of the electric oil pump for the vehicle, as claimed in claim 1, wherein:
- the first engine automatic-stop control permission judgment section judges that the conditions by which the instant permission judgment can be possible are satisfied with the proviso that the conditions fall within their respective engine automatic-stop control permission ranges, and
- the second engine automatic-stop control permission judgment section judges that the conditions which require the certain time for the permission judgment are satisfied with the proviso that the conditions fall within their respective engine automatic-stop control permission ranges after the vehicle settles down from a transient state to a steady state just after the vehicle stop.

7. The engine automatic-stop control device with the failure judgment apparatus of the electric oil pump for the vehicle, as claimed in claim 6, wherein:
- the condition which requires the certain time for the permission judgment is a vehicle stop road surface inclination θ that is determined from a longitudinal acceleration detection value detected by a longitudinal acceleration sensor which is provided in the vehicle.

8. A method for judging a failure of an electric oil pump used for a transmission in a vehicle having an engine automatic-stop control device by which, the vehicle can travel by power from an engine through the transmission, and during engine operation, the transmission is controlled by hydraulic pressure from an engine-driven oil pump driven by the engine, and upon a judgment of vehicle stop, when predetermined conditions are satisfied, an engine automatic-stop control that automatically stops the engine is performed, also the transmission is kept in a power transmission starting state that is a state just before starting to transmit the power by working fluid from the electric oil pump that is driven by a dedicated motor instead of the engine-driven oil pump, the method comprising:
- issuing a pump test drive command to the dedicated motor before the engine stop by the engine automatic-stop control; and
- judging the failure of the electric oil pump by a judgment as to whether the electric oil pump is actually driven in response to the pump test drive command.

* * * * *